June 3, 1958 — E. BUSCH — 2,837,332
CONTINUOUS FILM REEL
Filed May 21, 1953 — 3 Sheets-Sheet 1

INVENTOR.
Edwin Busch.
BY
Fearman & Fearman
ATTORNEYS

June 3, 1958 E. BUSCH 2,837,332
CONTINUOUS FILM REEL
Filed May 21, 1953 3 Sheets-Sheet 2

INVENTOR.
Edwin Busch.
BY
*Harman & Harman*
ATTORNEYS

June 3, 1958 E. BUSCH 2,837,332
CONTINUOUS FILM REEL

Filed May 21. 1953 3 Sheets-Sheet 3

INVENTOR.
Edwin Busch.
BY
Fearman & Fearman,
ATTORNEYS

United States Patent Office 2,837,332
Patented June 3, 1958

2,837,332

CONTINUOUS FILM REEL

Edwin Busch, Saginaw, Mich.

Application May 21, 1953, Serial No. 356,546

16 Claims. (Cl. 271—2.18)

This invention relates to film reels and more particularly to a continuous film reel which is adapted to rotatably support a flat endless coil of motion picture film in a manner to permit it to be continuously fed through a projector.

One of the prime objects of the invention is to design a continuous film reel which operates smoothly and easily without scratching or unduly wearing the film, thus insuring longer film life, and more distinct unmarred pictures.

A further object of the invention is to provide a continuous film reel including a rotatable film carrier on which the coil is mounted, which operates without placing appreciable tension on the film, means being provided to assist the film to slip evenly relative to the carrier to compensate for the different winding and unwinding speeds of the film.

Another object of the invention is to provide a continuous reel including a film carrier rotatable by the projector mechanism drawing the film from the reel, but which can be independently driven, if desired, to feed the film to the projector.

A further object of the invention is to provide a continuous reel in which the coil of film is supported on smooth, highly polished, raised ribs provided on a rotatable carrier and which slides thereon with a minimum of frictional resistance.

Another object of the invention is to provide a continuous film reel in which means are provided to prevent the loosely coiled film from crowding to one side and binding during the operation of the projector.

A further object of the invention is to provide a continuous film reel of the type described in which the coil of film is in contact with a slip ring of decreased depth which prevents it from wrapping around and binding on the hub of the carrier and scratching the surface of the film.

Another object of the invention is to provide a continuous film reel of the type described in which the winding hub is cylindrical and outwardly sloped to retain the inner convolution of the film coil in engagement with the slip ring means, and to guide the leading portion of the endless film as it leaves the reel.

A still further object of the invention is to design a continuous motion picture reel which is of simple and practical construction and which can be economically manufactured and assembled.

With the above and other objects in view, the present invention consists in the combination and arrangement of parts, hereinafter more fully described, illustrated in the accompanying drawings, and more particularly pointed out in the appended claims, it being understood that charges may be made in the form, size, proportion, and minor details of construction, without departing from the spirit, or sacrificing any of the advantages of the invention.

Figure 2:
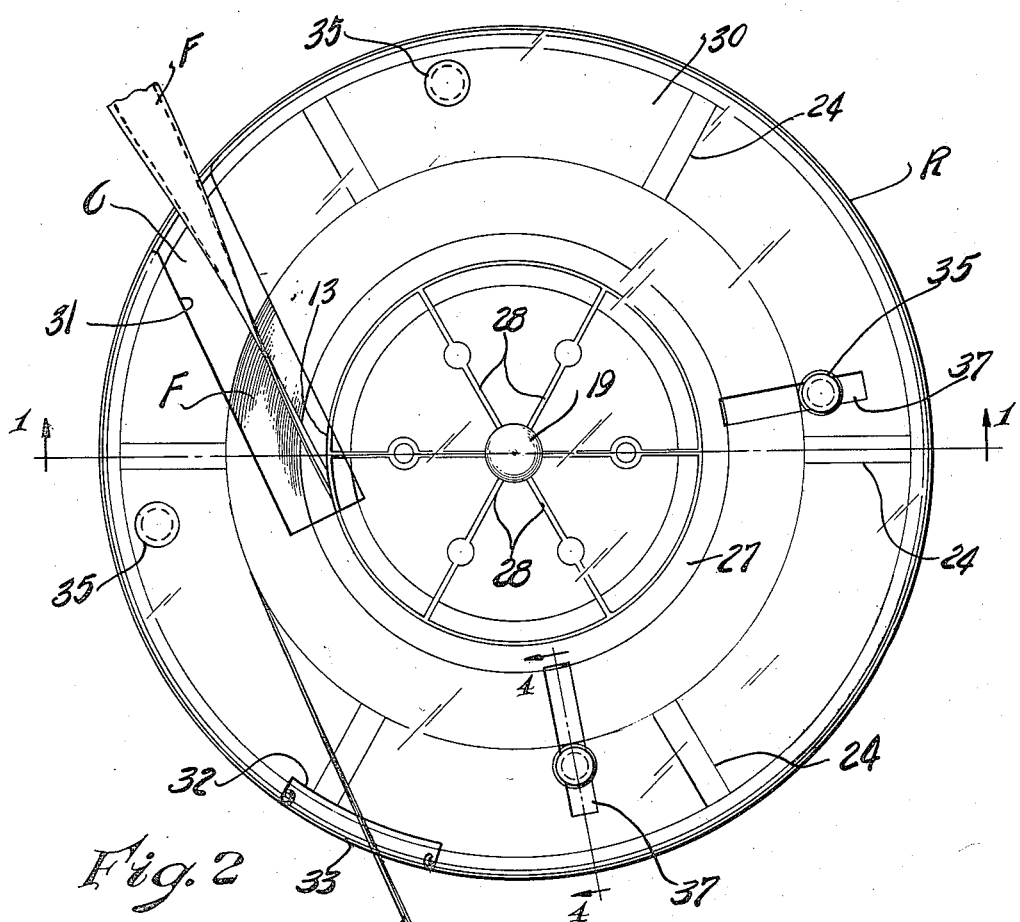
Fig. 2 is a top plan view of the reel with the film being shown winding on and being unwound from the reel.
Figure 1:
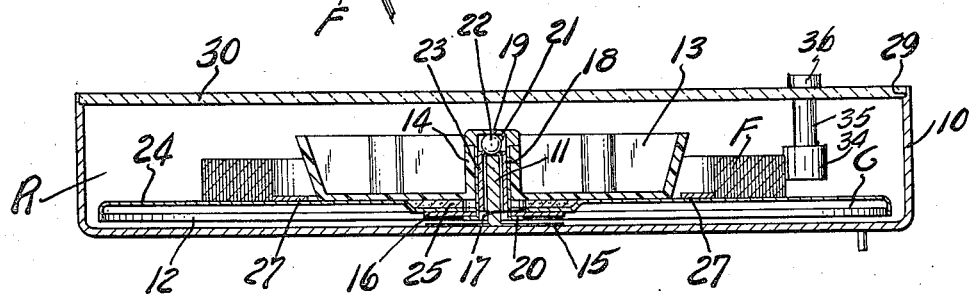
Fig. 1 is a sectional, elevational view of my new reel taken on the line 1—1 of Fig. 2.

Referring now to the accompanying drawings in which I have shown the preferred embodiment of my invention, and more particularly to Figs. 1 and 2 thereof, the latter R generally indicates my continuous reel which comprises a cylindrical outer casing or magazine 10 provided with a fixed spindle 11. Rotatably supported on the spindle 11, in a manner to be presently described, is a film carrier C which includes a disk 12 and an inverted, conical-shaped winding drum 13 fixed on the face thereof, said drum being formed with a tubular, hollow hub 14, and for a purpose to be presently described.

A reinforcing plate 15 is provided on the casing 10, and a similar plate 16 is mounted on the underside of said disk. The disk 12 is provided with a central opening 17 in alignment with the hollow hub 14, and a tubular member 18, formed with an enlarged head 19, extends therethrough and is shouldered to seat on the upper end thereof, the lower end of the member 18 being turned as at 20 and is fixed to the plate 16 to secure the carrier C in assembled relation. The head 19 of the member 18 is hollow as at 21 to accommodate a ball bearing 22, and a sleeve or bushing 23 is provided in the member 18 to support said ball. Thus, when the carrier C is mounted on the spindle 11, the ball 22, only, is in engagement therewith, and it will therefore be clear that the carrier will revolve freely with a minimum of frictional contact.

Figure 3:
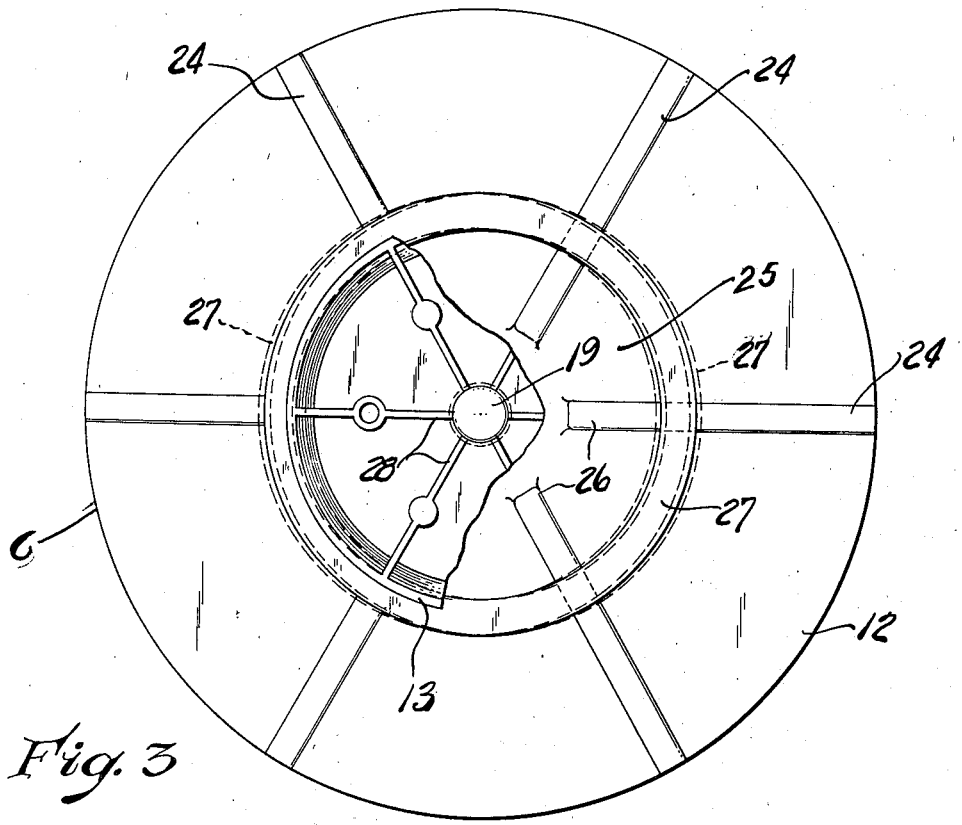
Fig. 3 is a top plan view of the rotatable film carrier only, a portion of the winding hub being broken away to illustrate the operation of the slip ring, the broken lines showing that the ring is transversely movable with relation to the winding hub.
Figure 4:
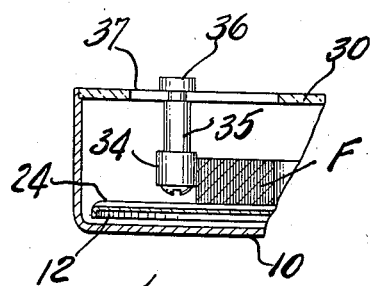
Fig. 4 is a fragmentary, sectional, side elevational view showing a film guide roller in engagement with the coil of film.

The disk 12 of the carrier is preferably formed of a light metal and a plurality of radially extending, raised ribs 24 are formed thereon to support the loosely wound film coil F, these ribs being highly polished so that there is a minimum of frictional contact between the film and disk as the individual film coils close centrally to unwinding position. It will be observed that the ribs 24 terminate short of the opening 17 in the disk and that a friction disk 25 is secured centrally thereon, radial slots 26 (see Fig. 3 of the drawings), being provided in the disk 25 to accommodate the ribs 24. The disk 25 is preferably formed of a cork or other high friction material and is adapted to yieldingly engage and hold the slip ring 27 in a manner which will be presently described. Radially extending ribs 28 reinforce the drum 13 and these ribs can be of any desired shape or design. The inner diameter of the slip ring 27 is greater than the base diameter of the inverted conical-shaped drum, so that the ring 27 is only loosely associated with the peripheral outer face of the drum, and it will be observed that the body of the coiled film F is disposed outwardly of the ring 27.

The upper peripheral edge of the outer casing 10 is shouldered as at 29, and a transparent cover 30 is supported therein. A slotted opening 31, out of which the film leads, is provided in the cover 30 and the edge of the cover is also recessed as at 32 above the opening 33 in the peripheral wall of the casing 10 through which the film strip returns. For balance, the film strip should return to the coil at a circumferential point close to the point where it leaves the coil, and the oppositely disposed openings 31 and 32 will therefore be closely adjacent each other. To control the coil and prevent its crowding, a plurality of circumferentially spaced guide rollers 34 are mounted on studs 35 which depend from the cover 30 and engage the outer film convolution, one pair of these studs being located rearwardly of the point where the film returns to the coil, and these are shouldered as at 36 and are radially adjustable in the slots 37 provided in the cover to suit coils of different size.

Figure 5:
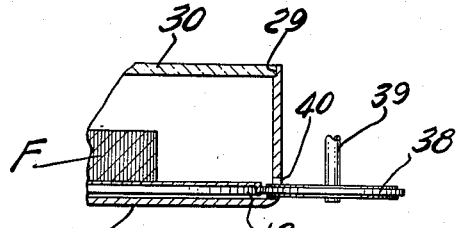
Fig. 5 is a similar view depicting means for driving the film carrier.

In practice, with the systems which do not employ separate driving means such as illustrated in Fig. 5, the carrier will be rotated by the pull of the film as it is being drawn from the reel by the projector mechanism. The slip ring 27 is of prime importance as it shifts transversely on the disk whenever a predetermined tension is built up on the film coil; thus equalizing and compensating for the difference in speeds of the inner diameter of the coil from which the tape feeds to the projector and the outer diameter of the coil onto which the tape is wound as it leads back from the projector.

Figure 6:
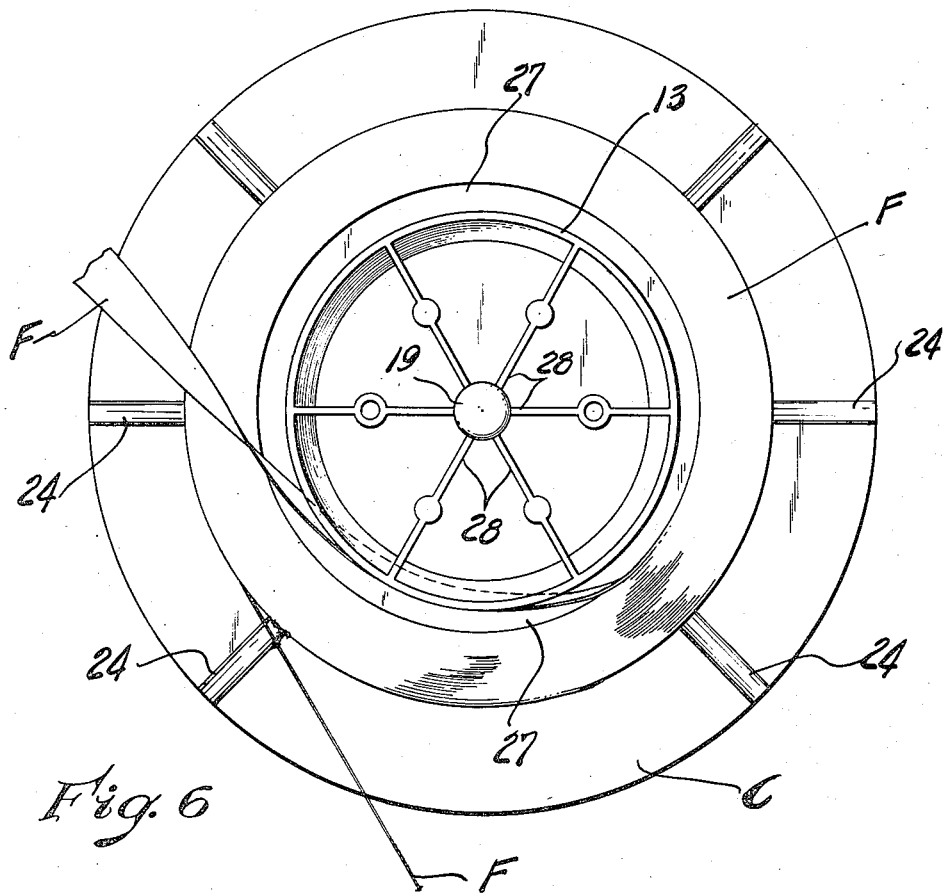
Fig. 6 is a top plan view of the film carrier, the slip ring being shown drawn in against the winding hub by the drag on the film leaving the reel.
Figure 7:
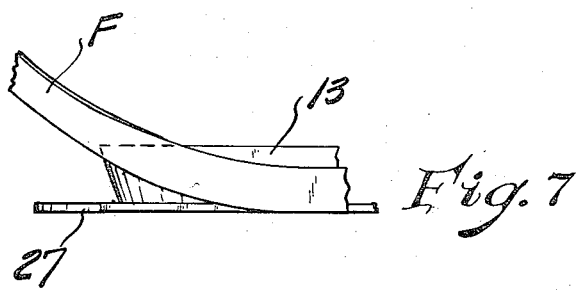
Fig. 7 is a fragmentary, elevational view showing the innermost coil of the film coil guiding on the sloped peripheral wall of the winding hub as it is unwound from the reel.

With particular reference now to Figs. 6 and 7 of the drawings, it will be obvious that the relative radial distances from the axis of the drum 13 to the outer and inner peripheries of the film coil vary considerably and therefore slippage must occur to compensate for this difference, or the film would eventually snap due to the rewind pull. As will be apparent from Fig. 7, the leading portion of the film strip which is drawn from the inner periphery of the coil, is prevented by the slip ring 27 from binding on the drum 13, and guides on the upwardly pitched face of the drum 13 as it leaves the reel. When the innermost convolution of the coil is bearing against the outer edge of the ring 27, the ring is pressed against the friction disk 25, and the film and carrier rotate in unison. The ring 27 rests on the cork disk 25 as will be apparent from an inspection of Figs. 1 and 3, and the outer periphery of the ring 27 is spaced from the outermost surface of the drum so that the film may freely guide on the drum as it leaves the carrier. The force exerted on the ring 27 by the film due to the take-up drag thereon has both a downward and inward component. Rotation of the film and carrier in unison will rewind the film (in footage) at a faster speed than it is unwound, thus slowing the convolutions and temporarily relieving them of the take-up pressure thereon. As the film continues to unwind, the carrier slips relative to the unwinding portion of the coil, until the speed of the rewinding film falls below the speed of the unwinding film leaving the reel, and the take-up drag again presses the ring 27 into engagement with the friction disk 25. The ring slips whenever the film unwinds at too great a speed relative to the re-winding speed of the film and the latter tends to slip too rapidly and bind and thence immediately engages the cork disk until the slippage is slowed down. Clearly, the film never comes into binding engagement with the winding drum and cannot be scratched or worn thereby. The leading edge of the film passes freely out the gap between the upper edge of the film body and drum at all times. Moreover, the slipping of the body of the film F relative to the carrier is even and the film tends to control itself in that it does not bunch and/or crowd.

The rollers 34 further control the film and resist any tendencies of the film to bunch on one side. The radial position of the rollers 34 opposite the points where the film leaves and returns to the coil, are adjustable to control the film coil for best results and to adapt to coils of varying width.

The design is also useful with reels in which independent means, such as a flexible disk 38 on a shaft 39 (see Fig. 5 of the drawings), extend through an opening 40 in the peripheral wall of the casing 10 into engagement with the carrier. The disk 38 drives the carrier at the same speed as the projector so that there is no take-up drag or tension on the film. While the carrier travels at a constant speed, the body of the coil of film slips relative thereto due to the difference in diameter of the winding and unwinding convolutions. With so-called "green" or new film which is often somewhat sticky, the film will not slip evenly and will tend to stick and bunch, thus binding the slip ring. Further, if the film will not float freely from the driven carrier, the take-up drag of the projector will be exerted thereon. When either pressure is applied to the slip ring, the ring is urged into engagement with the friction disk 25, which action prevents the leading portion of the film from slipping relative to the carrier until the stickiness is relieved, and the film is unwound normally by the carrier. Relaxation of the tension on the film, of course, releases the slip ring. The film is not permitted to come into binding engagement with the face of the winding drum and contacts the pitched guiding face of the drum only as it leaves the reel. The adjustable rollers 34 prevent bunching due to the resistance of the film to rewinding, which, of course, opposes the rotation of the carrier and would prevent uneven slippage of the film and cause it to bind against the slip ring.

It will thus be readily apparent that I have perfected a continuous film reel which is superior in performance and insures longer film life, and which can be manufactured and assembled economically, so that a plurality of reels, each with a particular film thereon, can be used interchangeably in magazine fashion as in the continuous projection unit which forms the subject matter of my co-pending application.

It is not to be understood, however, that the device is limited to use with film, since it is obvious that it may find widespread use in other fields wherein a coiled strip is to be wound and rewound such as the tape recording field and the like.

What I claim is:

1. In a continuous film reel, support means, a carrier rotatably mounted thereon, an endless coil of film supported flatwise on said carrier, a portion of which leads from the inner periphery thereof and returns to the outer periphery thereof, a central drum on said carrier around which said coil of film is disposed, and disk means of reduced thickness relative to the width of the film and depth of the drum separating the innermost convolution of said coil and the drum and with the drum guiding said film as it is unwound from said reel.

2. The combination defined in claim 1 in which the peripheral wall of said drum is outwardly and upwardly sloped and extends beyond said film.

3. The combination defined in claim 1 in which said means comprises a slip ring having an inner diameter slightly greater than the adjacent peripheral wall of the drum.

4. In a continuous film reel, a horizontally disposed, cylindrical outer casing having a fixed spindle in the bottom thereof, a film carrier assembly for supporting an endless coil of film, said carrier including a disk, a drum having a hub, a tubular member concentrically spaced from said spindle with an enlarged head fitting over the hub of said winding drum and extending therethrough, the opposite end of said tubular member being turned laterally to unite said carrier assembly, a bushing on said spindle, and an anti-friction ball supported on said spindle and said bushing for rotatably supporting said member and thereby said carrier assembly on said spindle.

5. In a continuous film reel, support means, a carrier rotatably mounted thereon for supporting an endless coil of film, a portion of which leads continuously from the inner periphery thereof, and thence returns to and is wound on the outer periphery of the coil, a central drum on said carrier with outwardly and upwardly sloped peripheral walls, a friction member on said carrier, and a slip ring resting on said friction member movable relative to said drum and separating the inner convolution of said coil and the face of the drum, said ring being engageable with said disk member under the pressure of said film to prevent relative slippage of the carrier and film.

6. The combination defined in claim 5 in which said support means comprises an outer casing with a cover, and circumferentially spaced guide rollers depending from said cover to control said film coil, certain of said rollers being radially adjustable on said cover.

7. The combination defined in claim 5 in which said film is supported on highly polished, radially extending, raised ribs provided on said disk.

8. The combination set forth in claim 5 in which the drum is shaped similar to an inverted cone.

9. In a continuous reel for an endless coiled strip which is continuously unwound from the inner periphery thereof and rewound on the outer periphery thereof, support means, a carrier rotatably mounted thereon for supporting said endless coiled strip, a central hub around which said coil of film is disposed, and clutch means between the inner convolution of said film and the drum having considerable surface area adjacent said carrier surface held by said carrier surface to rotate therewith and disengageable therefrom dependent on the pressure exerted on said means by said film, to insure an even slippage of the film to compensate for the different peripheral speeds of unwinding and rewinding.

10. The combination defined in claim 1 in which the outer peripheral edge of said disk is disposed outwardly of the peripheral surface of said drum to provide a gap for free passage of the leading portion of the innermost convolution of said film up between the body of said coil and drum.

11. In a continuous film reel, support means, a carrier having relative rotation therewith, an endless coil of film supported flatwise on said carrier, a loop portion of which extends from the outer and inner peripheries thereof, a drum reduced in diameter relative to said carrier and projecting therefrom around which said coil of film is disposed, and means on said carrier radially outwardly of said drum of reduced thickness relative to the width of the film and depth of the drum separating the innermost convolution of said coil and the drum and with said drum guiding said film at the inner periphery of said coil.

12. In a continuous film reel, support means, a carrier having relative rotation therewith, an endless coil of film supported flatwise on said carrier, a loop portion of which extends from the outer and inner peripheries thereof, a drum mounted on said carrier and extending outwardly therefrom around which said coil of film is disposed, a friction member on said carrier adjacent said drum, and clutch means separating said film and drum engageable with said member to rotate therewith and disengageable therefrom to slip relative to said carrier dependent on the pressure exerted thereon by said film.

13. The combination defined in claim 9 in which said clutch means is of reduced thickness and said drum extends outwardly from said carrier beyond said clutch means to permit the leading end of the unwinding film to guide on said drum as it leaves said clutch means.

14. In a continuous reel, support means, a carrier having relative rotation therewith about an axis of rotation, an endless coil of film supported flatwise on said carrier, a loop portion of which extends from the outer and inner peripheries thereof, means inward of the periphery of the carrier and forming a film guide supported to extend axially relative to said carrier outward of said carrier and around which said coil of film is disposed, and means on said carrier, radially outwardly of the means forming said guide of reduced thickness relative to the width of the film and depth of the means forming the guide separating the innermost convolution of said coil and the guide and with said guide guiding said film at the inner periphery of said coil.

15. In a continuous film reel, support means, a carrier having relative rotation therewith about an axis of rotation, an endless coil of film supported flatwise on said carrier, a loop portion of which extends from the outer and inner peripheries thereof, means radially inward of the periphery of the carrier and forming a film guide supported to extend axially relative to said carrier and around which said coil of film is disposed, said carrier having a friction surface thereon adjacent said means forming the guide, and clutch means separating said film and means forming the guide engageable with said surface to rotate therewith and disengageable therefrom to slip relative to said carrier dependent on the pressure exerted thereon by said film.

16. In a continuous reel for an endless coiled strip which is unwound continuously from the inner periphery thereof and rewound on the outer periphery thereof, support means, a carrier rotatably mounted thereon for supporting said endless coiled strip, means forming a relatively centrally disposed guide around which said coiled film is disposed, and clutch means between the inner convolution of said film and the guide having considerable surface area adjacent said carrier surface frictionally held by said carrier surface to rotate therewith and disengageable therefrom dependent on the pressure exerted on the said means by said film to insure an even slippage of the film to compensate for the different peripherial speeds of unwinding and rewinding.

References Cited in the file of this patent

UNITED STATES PATENTS

| 1,382,040 | Wilson | June 21, 1921 |
| 1,627,198 | Penin | May 3, 1927 |
| 2,183,117 | Daniel | Dec. 12, 1939 |
| 2,238,719 | Tartas | Apr. 15, 1941 |
| 2,288,983 | Weiss | July 7, 1942 |
| 2,426,838 | Miller | Sept. 2, 1947 |
| 2,490,771 | Begun | Dec. 13, 1949 |
| 2,656,184 | Eddy | Oct. 20, 1953 |

FOREIGN PATENTS

| 869,914 | France | Feb. 24, 1942 |